Patented Dec. 28, 1943

2,337,834

UNITED STATES PATENT OFFICE 2,337,834

POLYMERIC MATERIAL

Franklin Traviss Peters, Wilmington, Del., assignor to E. I. du Pont de Nemours & Company, Wilmington, Del., a corporation of Delaware No Drawing. Application May 7, 1940,
Serial No. 333,873

14 Claims. (Cl. 260—33)

This invention relates to polyamides and more particularly to plasticized synthetic linear polyamides.

High molecular weight synthetic linear polyamides are strong, usually have high melting points and for many purposes, e. g. fibers and bristles, are sufficiently pliable. For certain uses, however, particularly wrapping films and coatings for fabrics, increased pliability and workability are desired. Plasticizers in general tend to reduce the strength of polyamides, and as a rule cause an undesirable lowering in the melting point.

This invention has as an object the production of synthetic linear polyamide compositions which are soft, pliable, and tough over a wide temperature range, and which nevertheless have substantially the same melting points as the unmodified polymers.

This and other objects which will become apparent from the following description are accomplished by incorporating in the polyamide an ester derived from a monocarboxylic acid containing at least six carbon atoms and a polyhydric alcohol in which at least one hydroxyl group is left unesterified.

The synthetic linear polyamides with which this invention is concerned are of the general type described in U. S. P. 2,071,250, 2,071,253, and 2,130,948. Since one of the most characteristic properties of these polyamides is their ability to be formed into strong pliable fibers, they are referred to as "fiber-forming polyamides" or "superpolyamides." In general, the polyamides do not have fiber-forming or film-forming properties unless they have been polymerized to a sufficiently high degree to have an intrinsic viscosity of at least 0.4, where intrinsic viscosity is defined as in U. S. P. 2,130,948. Structurally the polyamides are long chain, high molecular weight polymers having a plurality of amide or thioamide groups as an integral part of the main chain of atoms in the polymer. The average number of carbon atoms separating the amide groups is at least two. On hydrolysis with strong mineral acids the polyamides revert to monomeric bifunctional amide-forming compounds. Thus, a polyamide derived from a diamine and a dibasic carboxylic acid yields, on hydrolysis with hydrochloric acid, a diamine hydrochloride and a dibasic carboxylic acid, whereas a polyamide derived from an amino acid yields a monoaminomonocarboxylic acid hydrochloride.

In general, the synthetic linear polyamides are microcrystalline rather than resinous and have high melting points. They can be formed into many useful objects, without the use of solvents and plasticizers, merely by spinning, extruding, or otherwise forming the object from the molten polyamide. To improve the properties of the products thus formed it generally is desirable to subject them to a process of cold drawing (application of tensile stress) or to a process of cold working, for example, cold rolling (application of compressing stress) or to subject them to both cold drawing and cold working. The products thus formed show orientation in the direction of cold drawing or working. They are strong and for many purposes they possess adequate pliability. For certain uses, however, and particularly for use in the form of films, sheets and coatings, enhanced toughness at lower temperatures often is desirable. While plasticizers or other modifying agents heretofore discovered have their utility in improving the properties of polyamides, the increasing use to which polyamides have been put and the increasing number of desirable properties required of the polyamides, for most purposes, have made the discovery of new and economical plasticizers a matter of considerable importance to the art.

It has now been found that although esters formed by completely esterifying polyhydric alcohols with monocarboxylic acids, e. g. those derived from animal and vegetable oils, generally are incompatible with the polyamides, esters derived from monocarboxylic acids containing at least six carbon atoms and polyhydric alcohols, in which at least one of the hydroxyl groups is left unesterified (hereinafter referred to as partially esterified polyhydric alcohols), are compatible to a fairly high degree with the polyamides, yielding compositions having greatly improved pliability and toughness at low temperatures.

The acid constituent of the partial ester may be aromatic, aliphatic, alicyclic, or a mixture of such acids, while the alcohol constituent may contain aromatic, aliphatic or alicyclic groups but must contain at least two alcoholic hydroxyl groups, at least one of which is left free in the final product. Preferred partially esterified polyhydric alcohols are those in which the alcohol constituent is glycerol or a low molecular weight glycol. This class of partially esterified polyhydric alcohols may conveniently be prepared by heating a fatty oil, e. g. castor oil, with glycerol or with a low molecular weight glycol such as propylene glycol in the presence of an ester interchange catalyst such as lead oxide, sodium alkoxide, sulfamic acid, or sulfuric acid. Alternatively the partial esters can be prepared by partial esterification of a polyhydric alcohol with a fatty oil acid or acids. In other words, the fatty oils and the corresponding acids are equivalents for the instant purpose.

For most purposes quantities of the partially esterified polyhydric alcohol ranging from 1–75 per cent, and preferably from 10–40 per cent, by weight of the polyamide, are used to greatest advantage, the amount used depending on the nature of the partially esterified polyhydric alcohol and the properties desired in the final product. Whereas most compatible modifying agents will cause a marked lowering in the melting point of the polyamide, when incorporated in large quantities, partially esterified polyhydric alcohols have little effect on the melting point of the polyamide, even when used in large amounts. Since high melting compositions are desirable for many applications, such as leather substitutes, coated fabrics for upholstery purposes, transparent wrapping foil, molded articles, and the like, the partially esterified polyhydric alcohols are particularly useful as modifying agents for the polyamides.

A very convenient method for incorporating a partially esterified polyhydric alcohol in the polyamide consists in dissolving the former and the polyamide in a mutual solvent. Such solutions can be used in making filaments, films, rods, and the like, by evaporative or coagulative methods. The lower fatty acids, e. g. formic acid, are useful solvents for this purpose. Mixtures of chloroform and methanol, or ethanol and water, are especially useful solvents for the polyamide interpolymers. The partially esterified polyhydric alcohols also may be incorporated in the polyamides by melt blending.

The invention is described more specifically in the following examples, in which parts are by weight.

Example I

An interpolyamide is prepared by heating 300 parts of hexamethylenediammonium adipate, 200 parts of epsilon-aminocapronitrile, 200 parts of water, and 1 part of acetic acid for 1 hour at 195–200° C. under the generated pressure (250–300 lbs./sq. in.). The temperature is then raised over a half hour period to 235–240° C., water being bled off at such a rate as to maintain a pressure of 250 lbs./sq. in. Heating is continued under these conditions for 3 hours and then the pressure is gradually reduced to atmospheric, after which the heating is continued for 3.5 hours under reduced pressure (100 mm.). The resultant polymer has an intrinsic viscosity of 1.05, a melt viscosity of 3000–5000 poises at 250° C., and melts at 170–175° C.

Twenty-three (23) parts of castor oil and 11 parts of propylene glycol are heated for 0.5–1 hour at 180° C., causing the glycerol in the fatty oil to interchange with propylene glycol to such an extent that a mixture of partially esterified glycerol and propylene glycol esters results. Traces of propylene glycol and glycerol which are completey unesterified are removed by washing with water.

Ten (10) parts of the interpolymer described above and 10 parts of the above partially esterified polyhydric alcohols are dissolved in 40 parts of a mixture of equal volumes of chloroform and methanol by stirring at 60° C. for 2 hours. The solution then is cooled to room temperature and a portion poured onto a glass plate. By means of a leveling blade the solution is spread to an even layer and the solvent allowed to evaporate. The film is removed from the glass plate and final traces of solvent removed by aging at 65° C. for 15 hours. The film thus prepared is strong and is not cracked when dealt a severe blow at −18° C. It melts at 167° C. and has a tensile strength of 1000 lbs./sq. in. and an elongation of 174 per cent based on original dimensions.

Example II

Ten (10) parts of the interpolymer described in Example I, 6 parts of a mixture of o- and p-amylbenzene-sulfonamide, and 4 parts of the castor oil-propylene glycol interchange product described in Example I are dissolved in 40 parts of a mixture of equal volumes of chloroform and methanol by stirring at 60° C. for 2 hours. A film prepared in the same manner as described in Example I is soft and pliable and has tensile values of 985 and 1500 lbs./sq. in. based on original and break dimensions respectively.

Example III

An interpolyamide is prepared by heating equal molecular proportions of hexamethylenediammonium adipate and decamethylenediammonium sebacate at 230–250° C. under conditions which permit removal of the water formed during the reaction until the polymer has an intrinsic vicosity of 1.0 Twenty (20) parts of this polymer, 4 parts of diphenylolpropane, and 4 parts of glyceryl disalicylate are dissolved in 35 parts of normal butyl alcohol by heating in an oil bath for 4 hours at reflux temperature. The solution is cast while still hot on a glass plate previously heated at 100° C. The solvent is removed by baking in an oven at 100° C. for 2 hours. After allowing to cool, the film is removed from the plate by immersion in water for 2 hours. The film thus prepared is pliable and strong. It softens at 112° C. when tested in the open on a copper block and has tensile strength values of 3850 and 11,000 lbs./sq. in., based on original and break dimensions respectively.

Example IV

Ten (10) parts of the interpolymer described in Example I and 5 parts of glycerol monococonoate (monoglycerides of coconut oil acids) are dissolved in 40 parts of a mixture of equal volumes of chloroform and methanol by stirring at 60° C. for 2 hours. A film prepared in the same manner as described in Example I is clear, dry, and firm, has a melting point of 158–161° C. (as compared to 170–175° C. for the unmodified polymer) and tensile values of 1720 and 5500 lbs./sq. in. based on original and break dimensions respectively.

Example V

An interpolyamide is prepared by heating 276 parts of hexamethylenediammonium adipate and 414 parts of 12-aminostearic acid for 2.5 hours at 230° C. in a closed system. The water of reaction is then bled off and the polymer heated for 4 hours at 265–275° C. under reduced pressure (100 mm.). The product has an intrinsic viscosity of 0.98 and a melting point of 130° C.

Twenty (20) parts of the interpolymer described above, 6.5 parts of 1,12-diphenylol-octadecane, and 4.3 parts of the partially esterified polyhydric alcohol described in Example I are dissolved in 65 parts of a mixture of equal volumes of chloroform and methanol by stirring at 60° C. for 2 hours. The solution then is cooled to room temperature and a portion poured onto a glass plate. By means of a leveling blade the solution is spread to an even layer and the solvent allowed to evaporate. The film is removed from the glass plate and final traces of solvent removed by aging at 65° C. for 15 hours. The film thus prepared is strong, having a tensile value of 1150 lbs./sq. in. based on the original dimensions, an elongation of 512 per cent, and a melting point of 130° C.

*Example VI*

A sateen fabric was coated first with a composition (A) comprising 50 parts of an interpolyamide (derived from hexamethylene diammonium adipate and caprolactam in the ratio 60:40), 12.5 parts of the propylene glycol ester described in Example I, and 37.5 parts of 1,12-diphenylol-octadecane, and then with a second composition (B), containing in addition to the ingredients of composition (A) two parts of carbon black. The resultant coated fabric showed exceptionally good pliability and had a leather-like appearance and hand. It could be flexed at least two million times on a Schiltknecht flex machine without cracking or other failure, and had a scrub value of 2715 as determined by the scrub test described in Automotive Industries 49, 1262–6. These values greatly exceed those obtained with fabric coated with the interpolyamide alone.

*Example VII*

Films of 0.00085 inch thickness were made from an interpolyamide (A) prepared from 45 parts of hexamethylenediammonium adipate and 55 parts of 12-aminostearic acid and also from a composition (B) consisting of 97 parts of this same interpolyamide and 3 parts of the propylene glycol ester described in Example I. These films were subjected to a durability test which was carried out in the following manner. Standard size bags were fabricated from the said interpolyamide films and each bag filled with a fixed weight of beans. The bags then were enclosed in chambers, under controlled conditions of temperature and relative humidity (R. H.), and caused to fall repeatedly, from a uniform height. The number of falls before breaking was noted in each case. The superiority of films prepared from composition B will be apparent from the data recited in the following table:

| Film composition | Tumbling data at— | |
|---|---|---|
| | 75° F. and 35% R. H.[1] | 0° F. and 7% R. H.[1] |
| A | 314 | 83 |
| B | 906 | 200 |

[1] Relative humidity.

It is to be understood that the foregoing examples are merely illustrative of the compositions of this invention and their manner of preparation.

As additional examples of partially esterified polyhydric alcohols which may be used in making the compositions of this invention may be mentioned the monoesters of such acids as caprylic, pelargonic, caproic, lauric, palmitic, stearic, oleic, ricinoleic, and salicylic, with such glycols as ethylene glycol, propylene glycol, diethylene glycol, triethylene, butylene glycol, pentamethylene glycol, hexamethylene glycol, decamethylene glycol, and 1,12-octadecanediol.

The mono- or di-esters of the above-mentioned acids with glycerol and partial esters of sorbitol may also be used. Mixtures of partially esterified polyhydric alcohols also may be used.

This invention is not limited to compositions of polyamides and partially esterified polyhydric alcohols alone. The plasticizing effect of partially esterified polydric alcohols is increased by the presence of a small amount of water. Other nonsolvents containing alcoholic hydroxyl groups, particularly alcohols such as methanol, propanol, isobutanol, benzyl alcohol, cyclohexanol, hexamethylene glycol and glycerol have a similar effect. Moreover, there may be associated with the polyamide-partially esterified polyhydric alcohol compositions other types of plasticizers such as dibutyl phthalate, tricresyl phosphate, monomeric amides boiling over 220° C., cyclic ketones in which a carboxyl group forms a part of the ring structure, phenols, particularly high boiling phenols such as diamyl phenol and 1,12-diphenyloloctadecane, and sulfonamides, especially alkylaryl sulfonamides in which the alkyl group contains at least four carbon atoms.

The compositions of this invention also may contain other types of modifying agents, such as luster modifying agents, pigments, fillers, dyes, antioxidants, oils, antiseptics, and cellulose derivatives.

Polyamide-partially esterified polyhydric alcohol compositions are useful in many forms and for many purposes. Typical applications are yarns, fabrics, bristles, surgical sutures, fishing leaders, fishlines, dental floss, rods, tubes, films, ribbons, sheets, safety glass interlayers, molded articles, adhesives, electrical insulation (e. g., for wires), impregnating agents, and coating compositions, e. g. for cloth, paper, leather, metal and wood. The compositions also are useful for impregnating cloth which is to be calendered or pressed for use as collar interliners. An advantage which these plasticized polyamides have over unmodified polyamides is that they are more pliable over a wide range of temperatures. This advantage is most important in connection with the use of the product in sheet form. Typical uses for the material in this form are wrapping foils, leather applications, raincoats, shower curtains, and umbrellas.

The polyamide-partially esterified polyhydric alcohol compositions may be melt-extruded to form tubing or to coat fabric and metals. Similarly, they are useful in the preparation of blown articles such as toys and hollow toiletware. In addition, they may be compression molded, for example, blanketed, or stamped out into shaped articles.

As many apparently widely different embodiments of this invention may be made without departing from the spirit and scope thereof, it is to be understood that it is not to be limited to the specific embodiments thereof except as defined in the appended claims.

I claim:

1. A plasticized polymer substantially softer and more pliable than the unmodified polymer and containing as a plasticizing agent a monocarboxylic acid-polyhydric alcohol ester in which at least one hydroxyl group of the polyhydric alcohol is unesterified and in which the monocarboxylic acid constituent contains at least six carbon atoms, the said polymer being a fiber-forming synthetic linear polyamide wherein the average number of carbon atoms separating the amide groups is at least two and the melting point of said plasticized polymer not being substantially lower than the melting point of said unmodified polymer.

2. A composition of matter comprising a synthetic linear polyamide having an intrinsic viscosity of at least 0.4 and, in intimate admixture therewith as a plasticizing agent, a monocarboxylic acid-polyhydric alcohol ester in which at least one hydroxyl group of the polyhydric alcohol is unesterified and in which the monocarboxylic acid constituent contains at least six carbon atoms, said composition of matter being substantially softer and more pliable than the said unmodified polyamide and having a melting point not substantially lower than the melting point of said unmodified polyamide.

3. The composition of claim 2 wherein said polyamide is an interpolyamide.

4. A composition of matter comprising a synthetic linear polyamide having an intrinsic viscosity of at least 0.4 and, in intimate admixture therewith as a plasticizing agent, a monocarboxylic acid-polyhydric alcohol ester in which at least one hydroxyl group of the polyhydric alcohol is unesterified and in which the monocarboxylic acid constituent contains at least six carbon atoms, the said acid being a fatty oil acid, said composition of matter being substantially softer and more pliable than the said unmodified polyamide and having a melting point not substantially lower than the melting point of said unmodified polyamide.

5. The composition of claim 4 wherein the said fatty oil is castor oil acid.

6. A composition of matter comprising the interpolyamide derived from hexamethylene diammonium adipate and caprolactam in the ratio of 60:40, and, in intimate admixture therewith as a plasticizing agent, a monocarboxylic acid-polyhydric alcohol ester in which at least one hydroxyl group of the polyhydric alcohol is unesterified and in which the monocarboxylic acid constituent contains at least six carbon atoms, said composition of matter being substantially softer and more pliable than the said unmodified interpolyamide and having a melting point not substantially lower than the melting point of said unmodified interpolyamide.

7. The composition of claim 2 in which the ester-polyamide ratio therein is between 10:90 and 40:60.

8. A composition of matter comprising a synthetic linear polyamide having an intrinsic viscosity of at least 0.4 and, in intimate admixture therewith as a plasticizing agent, a monocarboxylic acid-polyhydric alcohol ester in which at least one hydroxyl group of the polyhydric alcohol is unesterified and in which the monocarboxylic acid constituent contains at least six carbon atoms; the said composition also comprising a non-solvent for the said polyamide, which non-solvent contains an alcoholic hydroxyl group, said composition of matter being substantially softer and more pliable than the said unmodified polyamide and having a melting point not substantially lower than the melting point of said unmodified polyamide.

9. A composition of matter comprising a synthetic linear polyamide having an intrinsic viscosity of at least 0.4 and, in intimate admixture therewith as a plasticizing agent, an ester substantially identical with that obtained by interreacting 23 parts of castor oil with 11 parts of propylene glycol for .5–1 hour at 180° C., the melting point of said composition of matter not being substantially lower than the melting point of said unmodified polyamide.

10. A composition of matter comprising a synthetic linear polyamide having an intrinsic viscosity of at least 0.4 and, in intimate admixture therewith as a plasticizing agent, an ester of castor oil acid and propylene glycol in which one hydroxyl group of said glycol is unesterified, the melting point of said composition of matter not being substantially lower than the melting point of said unmodified polyamide.

11. A plasticized polymer comprising a synthetic linear polyamide having an intrinsic viscosity of at least 0.4 and containing as a plasticizing agent a monocarboxylic acid-polyhydric alcohol ester in which the monocarboxylic acid constituent contains at least six carbon atoms and in which the polyhydric alcohol constituent contains two but not more than three hydroxyl groups at least one of which is unesterified, said plasticized polymer being substantially softer and more pliable than the unmodified polymer and having a melting point not substantially lower than the melting point of said unmodified polymer.

12. The composition of claim 10 wherein said polyamide is an interpolyamide.

13. A plasticized polymer substantially softer and more pliable than the unmodified polymer and containing as a plasticizing agent a monocarboxylic acid-polyhydric alcohol ester in which the monocarboxylic acid constituent is a fatty oil acid containing at least six carbon atoms and in which the polyhydric alcohol constituent contains two but not more than three hydroxyl groups at least one of which is unesterified, the said polymer being a fiber-forming synthetic linear polyamide wherein the average number of carbon atoms separating the amide groups is at least two, and the melting point of said plasticized polymer not being substantially lower than the melting point of said unmodified polymer.

14. The composition of claim 13 wherein said polyamide is an interpolyamide.

FRANKLIN TRAVISS PETERS.